United States Patent
Zheng

(10) Patent No.: US 10,034,021 B2
(45) Date of Patent: Jul. 24, 2018

(54) METHODS AND APPARATUSES FOR CODING AND DECODING DEPTH MAP

(71) Applicant: Huawei Technologies Co., Ltd., Shenzhen (CN)

(72) Inventor: Xiaozhen Zheng, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 34 days.

(21) Appl. No.: 14/795,746

(22) Filed: Jul. 9, 2015

(65) Prior Publication Data

US 2015/0312592 A1    Oct. 29, 2015

Related U.S. Application Data

(63) Continuation of application No. PCT/CN2014/070465, filed on Jan. 10, 2014.

(30) Foreign Application Priority Data

Jan. 10, 2013  (CN) .......................... 2013 1 0010169

(51) Int. Cl.
*H04N 7/12* (2006.01)
*H04N 11/02* (2006.01)
(Continued)

(52) U.S. Cl.
CPC ......... *H04N 19/597* (2014.11); *H04N 19/105* (2014.11); *H04N 19/139* (2014.11);
(Continued)

(58) Field of Classification Search
None
See application file for complete search history.

(56) References Cited

U.S. PATENT DOCUMENTS

| 5,832,126 A * | 11/1998 | Tanaka ............... H04N 1/41 |
| | | 382/176 |
| 2003/0043918 A1 * | 3/2003 | Jiang ............... H04N 19/59 |
| | | 375/240.25 |

(Continued)

FOREIGN PATENT DOCUMENTS

| CN | 101198066 A | 6/2008 |
| CN | 101646081 A | 2/2010 |

(Continued)

OTHER PUBLICATIONS

Jäger, "3D-CE6.h related: Model-based Intra Coding for Depth Maps using a Depth Lookup Table," Joint Collaborative Team on 3D Video Coding Extension Development of ITU-T SG 16 WP 3 and ISO/IEC JTC 1/SC 29/WG 11, $1^{st}$ meeting, Stockholm, Sweden, Document JCT2-A0010 (Jul. 16-20, 2012).

(Continued)

*Primary Examiner* — Sath V Perungavoor
*Assistant Examiner* — Xiaolan Xu
(74) *Attorney, Agent, or Firm* — Leydig, Voit & Mayer, Ltd.

(57) ABSTRACT

Embodiments of the present invention provide methods and apparatuses for coding and decoding a depth map. The coding method includes: obtaining prediction data corresponding to a current image block of the depth map, obtaining a predicted pixel value from the prediction data according to a preset step, and calculating a first average value of the prediction data according to the predicted pixel value, where the preset step is a positive integer except 1; obtaining a residual of the current image block according to the first average value of the prediction data and a pixel value of a pixel of the current image block; and coding the residual of the current image block. In this way, coding and decoding efficiency can be improved.

24 Claims, 7 Drawing Sheets

(51) Int. Cl.
*H04N 11/04* (2006.01)
*H04N 19/597* (2014.01)
*H04N 19/105* (2014.01)
*H04N 19/139* (2014.01)
*H04N 19/593* (2014.01)
*H04N 19/59* (2014.01)
*H04N 19/176* (2014.01)
*H04N 19/159* (2014.01)
*H04N 19/103* (2014.01)

(52) U.S. Cl.
CPC ........... *H04N 19/59* (2014.11); *H04N 19/593* (2014.11); *H04N 19/103* (2014.11); *H04N 19/159* (2014.11); *H04N 19/176* (2014.11)

(56) References Cited

U.S. PATENT DOCUMENTS

| | | | |
|---|---|---|---|
| 2009/0103616 A1* | 4/2009 | Ho | G06T 1/00 375/240.12 |
| 2009/0219994 A1* | 9/2009 | Tu | H04N 19/186 375/240.08 |
| 2010/0239002 A1 | 9/2010 | Park et al. | |
| 2011/0122225 A1 | 5/2011 | Kim et al. | |
| 2011/0310969 A1 | 12/2011 | Park et al. | |
| 2013/0113939 A1* | 5/2013 | Strandemar | G06T 5/10 348/164 |
| 2013/0251039 A1 | 9/2013 | Drugeon et al. | |
| 2014/0132610 A1* | 5/2014 | Lerios | G06T 1/00 345/501 |
| 2015/0016740 A1 | 1/2015 | Yie et al. | |

FOREIGN PATENT DOCUMENTS

| | | |
|---|---|---|
| CN | 101682781 A | 3/2010 |
| CN | 101873485 A | 10/2010 |
| CN | 102215392 A | 10/2011 |
| CN | 102648631 A | 8/2012 |
| CN | 102685505 A | 9/2012 |
| CN | 102790892 A | 11/2012 |
| CN | 103067715 A | 4/2013 |
| CN | 103067716 A | 4/2013 |
| CN | 103200406 A | 7/2013 |
| KR | 20110139882 A | 12/2011 |

OTHER PUBLICATIONS

Aflaki et al., "3DV-CE3: Non-Linear Depth Map Downsampling for 3DV-ATM Coding (Pre-processing)," Joint Collaborative Team on 3D Video Coding Extension Development of ITU-T SG 16 WP 3 and ISO/IEC JTC 1/SC 29/WG 11, $1^{st}$ meeting, Stockholm, Sweden, Document JCT2-A0109 (Jul. 16-20, 2012).

Li et al., "A Novel Upsampling Scheme for Depth Map Compression in 3DTV System," $28^{th}$ Picture Coding Symposium, Nagoya, Japan, PCS2010, pp. 186-189, Institute of Electrical and Electronics Engineers, New York City, New York (Dec. 8-10, 2010).

"Series H: Audiovisual and Multimedia Systems; Infrastructure of audiovisual services—Coding of moving video; Advanced video coding for generic audiovisual services," Recommendation ITU-T H.264, pp. 1-680, International Telecommunication Union, Geneva, Switzerland (Jan. 2012).

Bartnik, "HEVC Extension for Multiview Video Coding and Multiview Video plus Depth coding," Study Group 16 Question 6, $44^{th}$ meeting: San Jose, California, VCEG-AR13, pp. 1-42, International Telecommunication Union, Geneva, Switzerland (Feb. 3-10, 2012).

\* cited by examiner

METHODS AND APPARATUSES FOR CODING AND DECODING DEPTH MAP

CROSS REFERENCE

This application is a continuation of International Patent Application No. PCT/CN2014/070465 filed on Jan. 10, 2014, which claims priority to Chinese Patent Application No. 201310010169.0, filed on Jan. 10, 2013, both of which are hereby incorporated by reference in their entireties.

TECHNICAL FIELD

Embodiments of the present invention relate to image processing technologies, and in particular, to methods and apparatuses for coding and decoding a depth map.

BACKGROUND

A three-dimensional video image system includes two types of images: a view image and a depth map. The view image includes information, such as color information, of the image itself. The depth map includes depth information, such as contour information, of the view image. To reduce bandwidth occupied by video transmission during transmission of a three-dimensional video image, coding processing needs to be performed on the video image, including coding processing performed on the view image and the depth map, so as to reduce a data size of the three-dimensional video image.

In the prior art, coding processing of the depth map in the three-dimensional video image system uses an intra-frame prediction method. First, a coder splits a to-be-coded image block into one or more sub-image blocks to obtain an intra-frame prediction mode of a current image block, and obtains prediction data of the current image block according to the intra-frame prediction mode, where the image block and the sub-image blocks that are obtained by splitting the image block are generally and collectively referred to as an image block; the prediction data of the image block is used as reference data for coding and decoding the current image block; and the prediction data is pixel data that comes from a coded or decoded neighboring block, or a fixed value preset by a coding-decoding system, or other prediction data that comes from a neighboring block and is used for coding and decoding the current block. The coder successively performs a difference operation between a pixel value of each pixel in the image block and a pixel value of each corresponding pixel in the prediction data (or data of a reference block generated from the prediction data) to obtain a residual matrix, performs quantization, transformation, and entropy coding on the residual matrix, and sends a bitstream obtained by means of entropy coding to a decoder. The decoder reads a bit stream from the obtained bitstream, obtains a corresponding residual by performing dequantization and inverse coding, obtains the prediction data of the current image block, and adds the residual of the current image block and the pixel value of the prediction data (or the pixel value of the reference block generated from the prediction data) to obtain a pixel value of the current image block.

However, when a size of an image block is relatively large, if the method in the prior art is used to calculate an average pixel value of the image block and an average pixel value of a reference image block, a calculation amount is relatively large, and coding and decoding efficiency is low.

SUMMARY

Embodiments of the present invention provide methods and apparatuses for coding and decoding a depth map, improving coding and decoding efficiency.

A first aspect of an embodiment of the present invention provides a method for coding a depth map, including:

obtaining prediction data of a current image block of the depth map, obtaining a predicted pixel value from the prediction data according to a preset step, and calculating a first average value of the prediction data according to the predicted pixel value, where the preset step is a positive integer except 1;

obtaining a residual of the current image block according to the first average value of the prediction data and a pixel value of a pixel of the current image block; and coding the residual of the current image block.

With reference to the first aspect, in a first possible implementation manner, the obtaining a residual according to the first average value of the prediction data and a pixel value of a pixel of the current image block includes:

performing a difference operation between the pixel value of the pixel of the current image block and the first average value of the prediction data of the current image block to obtain the residual of the current image block; or obtaining data of the current image block of the depth map, obtaining a predicted pixel value from the data of the current image block according to the preset step, calculating a second average value of the data of the current image block according to the predicted pixel value of the data of the current image block, and performing a difference operation between the second average value of the data of the current image block and the first average value of the prediction data of the current image block to obtain the residual of the current image block.

With reference to the first aspect, in a second possible implementation manner, the obtaining a predicted pixel value from the prediction data according to a preset step includes:

using, according to a size of the current image block, an equal step in a horizontal direction and a vertical direction to obtain the predicted pixel value; or using, according to a size of the current image block, an unequal step in a horizontal direction and a vertical direction to obtain the predicted pixel value; or determining the preset step according to a size of the current image block, and obtaining the predicted pixel value according to the preset step.

With reference to the first aspect or either possible implementation manner of the first to the second possible implementation manners of the first aspect, in a third possible implementation manner, the method further includes:

coding a value of the preset step.

With reference to the first aspect or any one possible implementation manner of the first to the third possible implementation manners of the first aspect, in a fourth possible implementation manner, the preset step is used to identify an interval between position coordinates of the prediction data.

With reference to the first aspect or any one possible implementation manner of the first to the fourth possible implementation manners of the first aspect, in a fifth possible implementation manner, the coding the residual of the current image block includes:

mapping the residual to a mapping value of the residual, where the number of bits that represent the mapping value of the residual is less than the number of bits that represent the residual; and coding the mapping value of the residual.

With reference to the first aspect or any one possible implementation manner of the first to the fifth possible implementation manners of the first aspect, in a sixth possible implementation manner, before the obtaining a predicted pixel value from the prediction data according to a preset step, the method further includes:

determining, according to an intra-frame prediction mode of the current image block, whether the intra-frame prediction mode belongs to a preset intra-frame prediction mode set; and if yes, determining to obtain the predicted pixel value from the prediction data according to the preset step.

With reference to the sixth possible implementation manner, in a seventh possible implementation manner, the intra-frame prediction mode set includes at least one of the following intra-frame prediction modes:

a direct current (DC) mode,
a Planar mode,
an explicit Wedgelet mode, and
an intra-predicted Wedgelet partitioning mode.

A second aspect of an embodiment of the present invention provides a method for decoding a depth map, including:

obtaining prediction data of a current image block of the depth map, obtaining a predicted pixel value from the prediction data according to a preset step, and calculating a first average value of the prediction data according to the predicted pixel value, where the preset step is a positive integer except 1;

obtaining a residual of the current image block; and obtaining a pixel value of a pixel of the current image block according to the first average value of the prediction data and the residual of the current image block.

With reference to the second aspect, in a first possible implementation manner, the obtaining a pixel value of a pixel of the current image block according to the first average value of the prediction data and the residual of the current image block includes:

adding the first average value of the prediction data of the current image block and the residual of the current image block to obtain the pixel value of the pixel of the current image block; or adding the first average value of the prediction data of the current image block and the residual to obtain an average pixel value of the current image block, and using the average pixel value of the current image block as the pixel value of the pixel of the current image block.

With reference to the second aspect, in a second possible implementation manner, the obtaining a predicted pixel value from the prediction data according to a preset step includes:

using, according to a size of the current image block, an equal step in a horizontal direction and a vertical direction to obtain the predicted pixel value; or using, according to a size of the current image block, an unequal step in a horizontal direction and a vertical direction to obtain the predicted pixel value; or determining the preset step according to a size of the current image block, and obtaining the predicted pixel value according to the preset step.

With reference to the second aspect or either possible implementation manner of the first to the second possible implementation manners of the second aspect, in a third possible implementation manner, the method further includes:

parsing a bitstream to obtain a value that identifies the step.

With reference to the second aspect or any one possible implementation manner of the first to the third possible implementation manners of the second aspect, in a fourth possible implementation manner, the preset step is used to identify an interval between position coordinates of the prediction data.

With reference to the second aspect or any one possible implementation manner of the first to the fourth possible implementation manners of the second aspect, in a fifth possible implementation manner, the obtaining a residual of the current image block includes:

performing decoding processing on a coding result of the current image block to obtain a mapping value of the residual of the current image block; and mapping the mapping value of the residual to the residual, and using the residual as the residual of the current image block, where the number of bits that represent the mapping value of the residual is less than the number of bits that represent the residual.

With reference to the second aspect or any one possible implementation manner of the first to the fifth possible implementation manners of the second aspect, in a sixth possible implementation manner, before the obtaining a predicted pixel value from the prediction data according to a preset step, the method further includes:

determining, according to an intra-frame prediction mode of the current image block, whether the intra-frame prediction mode belongs to a preset intra-frame prediction mode set; and if yes, determining to obtain the predicted pixel value from the prediction data according to the preset step.

With reference to the sixth possible implementation manner, in a seventh possible implementation manner, the intra-frame prediction mode set includes at least one of the following intra-frame prediction modes:

a direct current (DC) mode,
a Planar mode,
an explicit Wedgelet mode, and
an intra-predicted Wedgelet partitioning mode.

A third aspect of an embodiment of the present invention provides an apparatus for coding a depth map, including:

a first processing module, configured to obtain prediction data of a current image block of the depth map, obtain a predicted pixel value from the prediction data according to a preset step, and calculate a first average value of the prediction data according to the predicted pixel value, where the preset step is a positive integer except 1;

a second processing module, configured to obtain a residual of the current image block according to the first average value of the prediction data and a pixel value of a pixel of the current image block; and a coding module, configured to code the residual of the current image block.

With reference to the third aspect, in a first possible implementation manner, the second processing module is specifically configured to perform a difference operation between the pixel value of the pixel of the current image block and the first average value of the prediction data of the current image block to obtain the residual of the current image block; or obtain data of the current image block of the depth map, obtain the predicted pixel value from the data of the current image block according to the preset step, calculate a second average value of the data of the current image block according to the predicted pixel value of the data of the current image block, and perform a difference operation between the second average value of the data of the current image block and the first average value of the prediction data of the current image block to obtain the residual of the current image block.

With reference to the third aspect, in a second possible implementation manner, the first processing module is specifically configured to use, according to a size of the current image block, an equal step in a horizontal direction and a vertical direction to obtain the predicted pixel value; or use, according to a size of the current image block, an unequal step in a horizontal direction and a vertical direction to obtain the predicted pixel value; or determine the preset step according to a size of the current image block, and obtain the predicted pixel value according to the preset step.

With reference to the third aspect or either one possible implementation manner of the first to the second possible implementation manners of the third aspect, in a third possible implementation manner, the coding module is further configured to code a value of the preset step.

With reference to the third aspect or any one possible implementation manner of the first to the third possible implementation manners of the third aspect, in a fourth possible implementation manner, the preset step is used to identify an interval between position coordinates of the prediction data.

With reference to the third aspect or any one possible implementation manner of the first to the fourth possible implementation manners of the third aspect, in a fifth possible implementation manner, the coding module is specifically configured to map the residual to a mapping value of the residual, where the number of bits that represent the mapping value of the residual is less than the number of bits that represent the residual, and code the mapping value of the residual.

With reference to the third aspect or any one possible implementation manner of the first to the fifth possible implementation manners of the third aspect, in a sixth possible implementation manner, the first processing module is further configured to determine, according to an intra-frame prediction mode of the current image block, whether the intra-frame prediction mode belongs to a preset intra-frame prediction mode set; and if yes, determine to obtain the predicted pixel value from the prediction data according to the preset step.

With reference to the sixth possible implementation manner, in a seventh possible implementation manner, the intra-frame prediction mode set includes at least one of the following intra-frame prediction modes:
 a direct current (DC) mode,
 a Planar mode,
 an explicit Wedgelet mode, and
 an intra-predicted Wedgelet partitioning mode.

A fourth aspect of an embodiment of the present invention provides an apparatus for decoding a depth map, including:
 a processing module, configured to obtain prediction data of a current image block of the depth map, obtain a predicted pixel value from the prediction data according to a preset step, and calculate a first average value of the prediction data according to the predicted pixel value, where the preset step is a positive integer except 1;
 a decoding module, configured to obtain a residual of the current image block, and obtain a pixel value of a pixel of the current image block according to the first average value of the prediction data and the residual of the current image block.

With reference to the fourth aspect, in a first possible implementation manner, the decoding module is specifically configured to add the first average value of the prediction data of the current image block and the residual of the current image block to obtain the pixel value of the pixel of the current image block; or add the first average value of the prediction data of the current image block and the residual to obtain an average pixel value of the current image block, and use the average pixel value of the current image block as the pixel value of the pixel of the current image block.

With reference to the fourth aspect, in a second possible implementation manner, the processing module is specifically configured to use, according to a size of the current image block, an equal step in a horizontal direction and a vertical direction to obtain the predicted pixel value; or use, according to a size of the current image block, an unequal step in a horizontal direction and a vertical direction to obtain the predicted pixel value; or determine the preset step according to a size of the current image block, and obtain the predicted pixel value according to the preset step.

With reference to the fourth aspect or either one possible implementation manner of the first to the second possible implementation manners of the fourth aspect, in a third possible implementation manner, the decoding module is further configured to parse a bitstream to obtain a value that identifies the step.

With reference to the fourth aspect or any one possible implementation manner of the first to the third possible implementation manners of the fourth aspect, in a fourth possible implementation manner, the preset step is used to identify an interval between position coordinates of the prediction data.

With reference to the fourth aspect or any one possible implementation manner of the first to the fourth possible implementation manners of the fourth aspect, in a fifth possible implementation manner, the decoding module is specifically configured to perform decoding processing on a coding result of the current image block to obtain a mapping value of the residual of the current image block; and map the mapping value of the residual to the residual, and use the residual as the residual of the current image block, where the number of bits that represent the mapping value of the residual is less than the number of bits that represent the residual.

With reference to the fourth aspect or any one possible implementation manner of the first to the fifth possible implementation manners of the fourth aspect, in a sixth possible implementation manner, the processing module is further configured to determine, according to an intra-frame prediction mode of the current image block, whether the intra-frame prediction mode belongs to a preset intra-frame prediction mode set; and if yes, determine to obtain the predicted pixel value from the prediction data according to the preset step.

With reference to the sixth possible implementation manner, in a seventh possible implementation manner, the intra-frame prediction mode set includes at least one of the following intra-frame prediction modes:
 a direct current (DC) mode,
 a Planar mode,
 an explicit Wedgelet mode, and
 an intra-predicted Wedgelet partitioning mode.

A fifth aspect of an embodiment of the present invention provides a method for coding a depth map, including:

obtaining prediction data of a current image block of the depth map, performing an arithmetic operation on every N pixels among pixels in the prediction data to obtain an arithmetic value of corresponding pixel values, and calculating a first average value of the prediction data according to the arithmetic value of the corresponding pixel values;

obtaining a residual of the current image block according to the first average value of the prediction data and a pixel value of a pixel of the current image block; and coding the residual of the current image block.

With reference to the fifth aspect, in a first possible implementation manner, the performing an arithmetic operation on every N pixels among pixels in the prediction data to obtain an arithmetic value of corresponding pixel values includes:

performing an averaging operation on the every N pixels among the pixels in the prediction data to obtain an average pixel value, and using the average pixel value as the arithmetic value of the corresponding pixel values.

With reference to the fifth aspect or the first possible implementation manner of the fifth aspect, in a second possible implementation manner, the obtaining a residual according to the first average value of the prediction data and a pixel value of a pixel of the current image block includes:

performing a difference operation between the pixel value of the pixel of the image block and the first average value of the prediction data of the current image block to obtain the residual of the current image block; or obtaining data of the current image block of the depth map, obtaining a predicted pixel value from the data of the current image block according to a preset step, calculating a second average value of the data of the image block according to the pixel value, and performing a difference operation between the second average value of the image block and the first average value of a reference image block of the current image block to obtain the residual of the current image block.

A sixth aspect of an embodiment of the present invention provides a method for decoding a depth map, including:

obtaining prediction data corresponding to a current image block of the depth map, performing an arithmetic operation on every N pixels among pixels in the prediction data to obtain an arithmetic value of corresponding pixel values, and calculating a first average value of the prediction data according to the arithmetic value of the corresponding pixel values;

obtaining a residual of the current image block; and obtaining a pixel value of a pixel of the current image block according to the first average value of the prediction data and the residual of the current image block.

With reference to the sixth aspect, in a first possible implementation manner, the performing an arithmetic operation on every N pixels among pixels in the prediction data to obtain an arithmetic value of corresponding pixel values includes:

performing an averaging operation on the every N pixels among the pixels in the current image block and the prediction data to obtain an average pixel value, and using the average pixel value as the arithmetic value of the corresponding pixel values.

With reference to the sixth aspect or the first possible implementation manner of the sixth aspect, in a second possible implementation manner, the obtaining a pixel value of a pixel of the current image block according to the first average value of the prediction data and the residual of the current image block includes:

adding the first average value of the prediction data of the current image block and the residual of the current image block to obtain the pixel value of the pixel of the current image block; or adding the first average value of the prediction data of the current image block and the residual to obtain an average pixel value of the current image block, and using the average pixel value of the current image block as the pixel value of the pixel of the current image block.

A seventh aspect of an embodiment of the present invention provides an apparatus for coding a depth map, including:

a first processing module, configured to obtain prediction data corresponding to a current image block of the depth map, perform an arithmetic operation on every N pixels among pixels in the prediction data to obtain an arithmetic value of corresponding pixel values, and calculate a first average value of the prediction data according to the arithmetic value of the corresponding pixel values;

a second processing module, configured to obtain a residual of the current image block according to the first average value of the prediction data and a pixel value of a pixel of the current image block; and a coding module, configured to code the residual of the current image block.

With reference to the seventh aspect, in a first possible implementation manner, the first processing module is specifically configured to perform an averaging operation on the every N pixels among the pixels in the prediction data to obtain an average pixel value, and use the average pixel value as the arithmetic value of the corresponding pixel values.

With reference to the seventh aspect or the first possible implementation manner of the seventh aspect, in a second possible implementation manner, the second processing module is specifically configured to perform a difference operation between the pixel value of the pixel of the image block and the first average value of the prediction data of the current image block to obtain the residual of the current image block; or obtain data of the current image block of the depth map, obtain the predicted pixel value from the data of the current image block according to a preset step, calculate a second average value of the data of the image block according to the predicted pixel value, and perform a difference operation between the second average value of the image block and the first average value of a reference block of the current image block to obtain the residual of the current image block.

An eighth aspect of an embodiment of the present invention provides an apparatus for decoding a depth map, including:

a processing module, configured to obtain prediction data corresponding to a current image block of the depth map, perform an arithmetic operation on every N pixels among pixels in the prediction data to obtain an arithmetic value of corresponding pixel values, and calculate a first average value of the prediction data according to the arithmetic value of the corresponding pixel values; and a decoding module, configured to obtain a residual of the current image block, and obtain a pixel value of a pixel of the current image block according to the first average value of the prediction data and the residual of the current image block.

With reference to the eighth aspect, in a first possible implementation manner, the processing module is specifically configured to perform an averaging operation on the every N pixels among the pixels in the current image block and the prediction data to obtain an average pixel value, and use the average pixel value as the arithmetic value of the corresponding pixel values.

With reference to the eighth aspect or the first possible implementation manner of the eighth aspect, in a second possible implementation manner, the decoding module is specifically configured to add the first average value of the prediction data of the current image block and the residual of the current image block to obtain the pixel value of the pixel of the current image block; or add the first average value of the prediction data of the current image block and the residual to obtain an average pixel value of the current image block, and use the average pixel value of the current image block as the pixel value of the pixel of the current image block.

According to the methods and the apparatuses for coding and decoding a depth map provided in the embodiments of the present invention, prediction data corresponding to a current image block of the depth map is obtained; a predicted pixel value is obtained from the prediction data according to a preset step; a first average value of the prediction data is calculated according to the predicted pixel value, where the preset step is a positive integer except 1; a residual of the current image block is obtained according to the first average value of the prediction data and a pixel value of a pixel of the current image block; and the residual of the current image block is coded. In this way, the number of reference pixels of the prediction data of the current image block can be reduced. Therefore, a calculation amount is remarkably reduced when the first average value of the prediction data of the current image block is acquired by means of calculation, improving coding efficiency. Correspondingly, when a decoder performs decoding processing on the current image block, if a decoding method that is corresponding to a coding method of a coder is used to perform decoding processing, a calculation amount is also remarkably reduced. Therefore, technical solutions of the embodiments of the present invention may be adopted to effectively improve coding and decoding efficiency.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In a three-dimensional video system, a depth map includes depth information, such as contour information, of a view image. A feature of the depth map is that a texture of most areas is relatively smooth. In general, sharp edge information is included only at an edge of an object, and pixel values of the depth map are relatively uniform and evenly distributed. Therefore, when an intra-frame prediction method is used to code each prediction of the depth map, a residual between an average pixel value of a to-be-coded image block and an average pixel value of a reference image block corresponding to the image block is used to perform coding. When a large-sized image block is coded, a relatively large calculation amount is required to calculate the average value of the image block or the average value of the reference image block. When the depth map is split into image blocks, an image block of a relatively large size generally includes less texture information. With reference to the feature that an image block of a relatively large size generally includes less texture information, in the embodiments of the present invention, before the residual between the average pixel value of the to-be-coded image block and the average pixel value of the reference image block corresponding to the image block is used to perform coding, some downsampling is first performed on the image block and the reference image block corresponding to the image block, and the average pixel value of the image block and the average pixel value of the reference image block corresponding to the image block are acquired according to pixels obtained after the downsampling, so as to reduce the calculation amount during coding and improve coding efficiency. The technical solutions of the present invention are described in detail with reference to several specific embodiments as follows.

Figure 1:
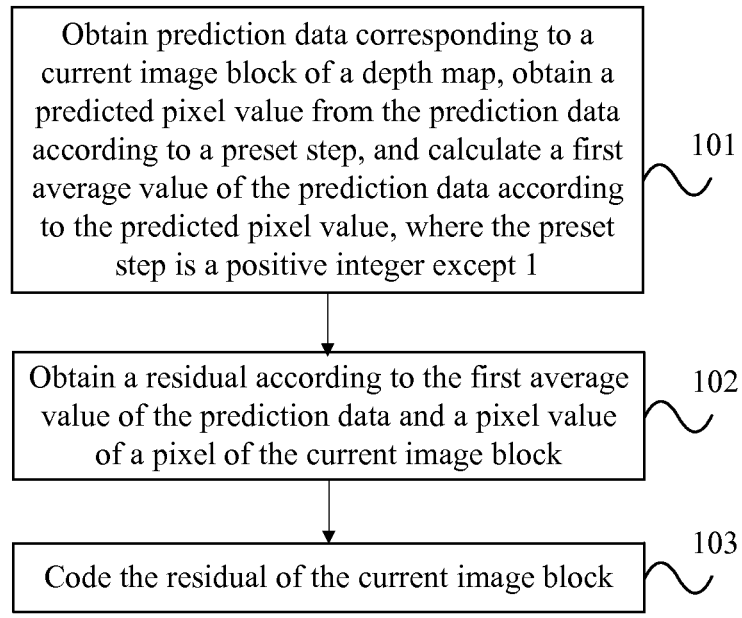
FIG. 1 is a schematic flowchart of Embodiment 1 of a method for coding a depth map according to the present invention.

FIG. 1 is a schematic flowchart of Embodiment 1 of a method for coding a depth map according to the present invention. This embodiment is executed by a coding apparatus. The method in this embodiment includes:

S101. Obtain prediction data corresponding to a current image block of the depth map, obtain a predicted pixel value from the prediction data according to a preset step, and calculate a first average value of the prediction data according to the predicted pixel value, where the preset step is a positive integer except 1.

In this embodiment, the preset step may be used to identify an interval between position coordinates of the prediction data.

S102. Obtain a residual according to the first average value of the prediction data and a pixel value of a pixel of the current image block.

S103. Code the residual of the current image block.

Specifically, a process in which a coder obtains the predicted pixel value from the prediction data according to the preset step is a process in which downsampling is performed on the prediction data.

Figure 2:
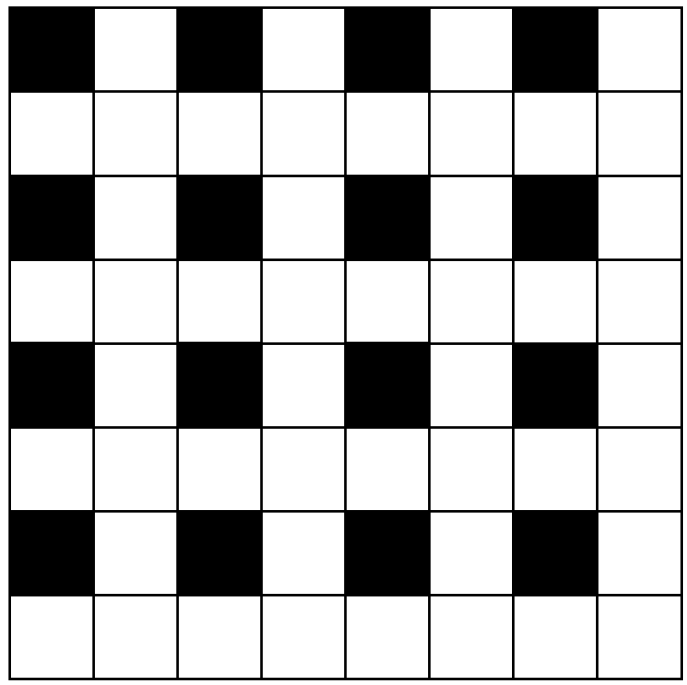
FIG. 2 is a schematic diagram of an image block of Embodiment 1 of a method for coding a depth map according to the present invention.

FIG. 2 is a schematic diagram of an image block of Embodiment 1 of a method for coding a depth map according to the present invention. As shown in FIG. 2, each square represents one pixel; a size of the prediction data of the current image block is 8×8, that is, 64 pixels. If the preset step is 2, 2:1 downsampling processing may be performed on the prediction data of the current image block. That is, sampling is performed once on each pixel in both horizontal and vertical directions to acquire a pixel, so that the predicted pixel value can be obtained. Black pixels shown in FIG. 2 are predicted pixel values, and the number of predicted pixel values is 16.

Then, the coder may calculate the first average value of the prediction data according to the predicted pixel value, and obtain the residual according to the first average value of the prediction data and the pixel value of the pixel of the image block.

Correspondingly, when a decoder performs decoding processing on the current image block, the decoder uses a processing process corresponding to that of the coder to process a reference image block corresponding to the current image block, further improving decoding efficiency.

In this embodiment, prediction data corresponding to a current image block of a depth map is obtained; a predicted pixel value is obtained from the prediction data according to a preset step; a first average value of the prediction data is calculated according to the predicted pixel value, where the preset step is a positive integer except 1; a residual is obtained according to the first average value of the prediction data and a pixel value of a pixel of the current image block; and the residual of the current image block is coded. In this way, the number of reference pixels of the prediction data of the current image block can be reduced. Therefore, a calculation amount is remarkably reduced when the first average value of the prediction data of the current image block is acquired by means of calculation, improving coding efficiency. Correspondingly, when a decoder performs decoding processing on the current image block, if a decoding method that is corresponding to a coding method of a coder is used to perform decoding processing, a calculation amount is also remarkably reduced. Therefore, a technical solution of this embodiment may be adopted to effectively improve coding and decoding efficiency.

In the foregoing embodiment, in specific implementation, the step S102 may be implemented, for example, in the following two manners:

Manner 1: Perform a difference operation between the pixel value of the pixel of the current image block and the first average value of the prediction data of the current image block to obtain the residual of the current image block;

Manner 2: Obtain data of the current image block of the depth map, obtain the predicted pixel value from the data of the current image block according to the preset step, calculate a second average value of the data of the current image block according to the predicted pixel value of the data of the current image block, and perform a difference operation between the second average value of the data of the current image block and the first average value of the prediction data of the current image block to obtain the residual of the current image block. In this case, the image block has only one residual value.

Compared with Manner 1, the foregoing Manner 2 may reduce the number of reference pixels of the data of the current image block; therefore, when the second average value of the data of the current image block is acquired by means of calculation, a calculation amount is remarkably reduced, further improving coding efficiency.

It should be noted that in Manner 2, a process in which the pixel value is obtained from the data of the current image block according to the preset step is similar to a process in which the predicted pixel value is obtained from the prediction data of the current image block according to the preset step, and details are not described herein again.

The following uses a specific embodiment to describe the technical solutions of the present invention in detail.

Figure 3:
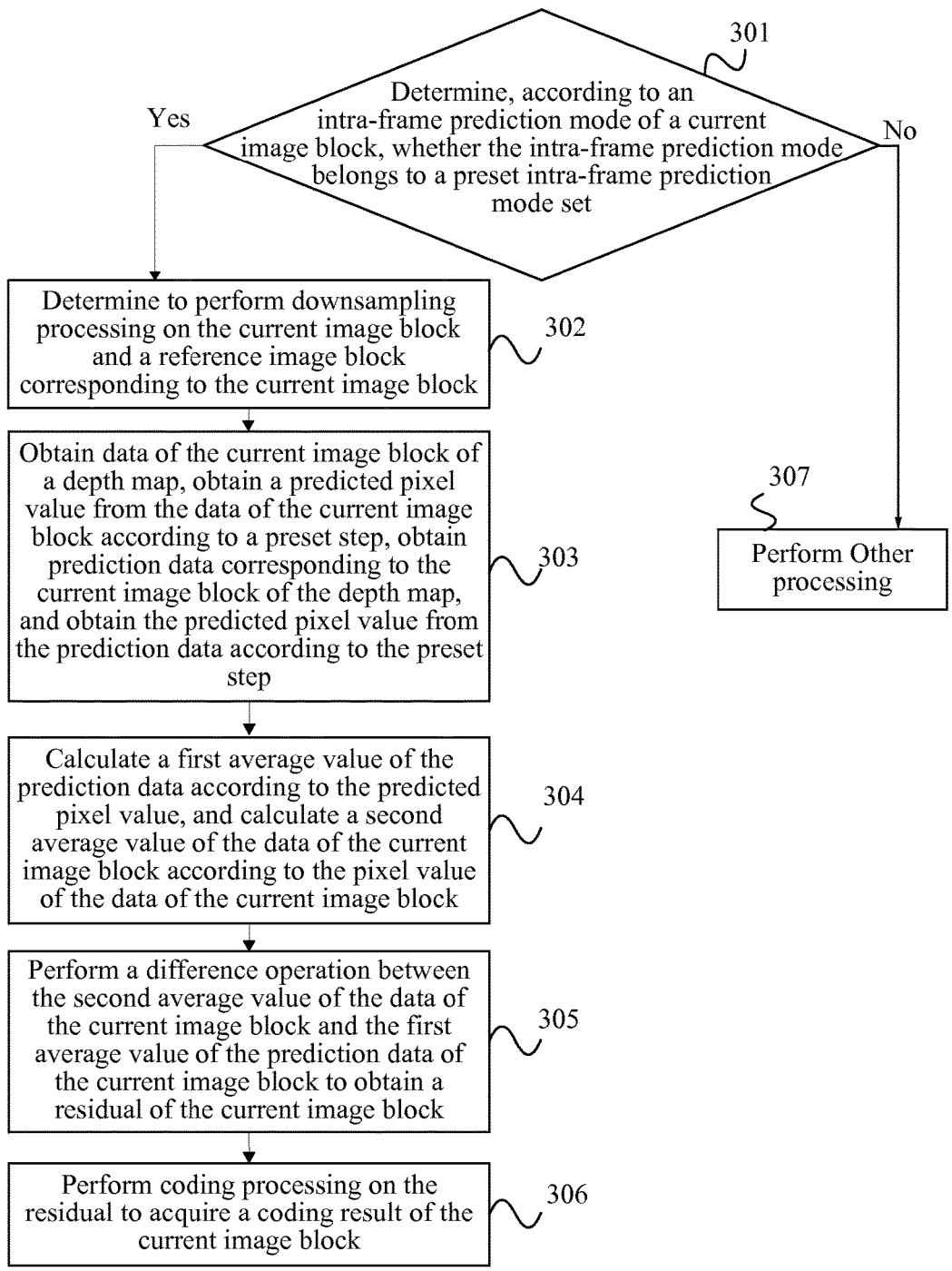
FIG. 3 is a schematic flowchart of Embodiment 2 of a method for coding a depth map according to the present invention.

FIG. 3 is a schematic flowchart of Embodiment 2 of a method for coding a depth map according to the present invention. This embodiment is executed by a coding apparatus. The method in this embodiment includes:

S301. Determine, according to an intra-frame prediction mode of a current image block, whether the intra-frame prediction mode belongs to a preset intra-frame prediction mode set. If yes, perform S302 to 306; if no, perform S307.

S302. Determine to perform downsampling processing on the current image block and a reference image block corresponding to the current image block.

The intra-frame prediction mode set in this embodiment includes at least a DC mode, a planar mode, an explicit wedgelet mode, and an intra-predicted wedgelet partitioning mode. Before downsampling processing is performed on the current image block and the reference image block according to a preset downsampling rule, whether the intra-frame prediction mode belongs to the intra-frame prediction mode set needs to be determined first. Correspondingly, when a decoder has a same intra-frame prediction mode set as a coder and before downsampling processing is performed on the reference image block, whether the intra-frame prediction mode belongs to the intra-frame prediction mode set also needs to be determined first. The preset intra-frame prediction mode set is a set of intra-frame prediction modes that can, as proved by tests, obtain relatively good coding processing performance by using the coding method in the steps S302 to S306.

If yes, it is determined that downsampling processing is performed on the current image block and the reference image block corresponding to the current image block.

It should be noted that the steps S301 and S302 are optional. These steps may not be performed, and the steps S303 to S306 may be performed directly.

S303. Obtain data of the current image block of the depth map, obtain a predicted pixel value from the data of the current image block according to a preset step, obtain prediction data corresponding to the current image block of the depth map, and obtain the predicted pixel value from the prediction data according to the preset step.

Optionally, the obtaining a predicted pixel value from the data of the current image block according to a preset step or the obtaining the predicted pixel value from the prediction data according to the preset step may be implemented in any of the following three manners:

Manner 1: Use, according to a size of the current image block, an equal step in a horizontal direction and a vertical direction to obtain the predicted pixel value.

For example, an equal step of 4 is used to obtain the predicted pixel value. For a current image block whose size is 64×64, if 4:1 downsampling is performed in the horizontal direction and the vertical direction to obtain the predicted pixel value, the number of the obtained predicted pixel values is 16×16.

Manner 2: Use, according to a size of the current image block, an unequal step in a horizontal direction and a vertical direction to obtain the predicted pixel value.

For example, a step 2 is used in the horizontal direction and a step 4 is used in the vertical direction to obtain the predicted pixel value. For a current image block whose size is 16×16, if 2:1 downsampling is performed in the horizontal direction to obtain a predicted pixel value in the horizontal direction, and 4:1 downsampling is performed in the vertical direction to obtain a predicted pixel value in the vertical direction, the number of the obtained predicted pixel values is 8×4.

Manner 3: Determine a step according to a size of the current image block, and obtain the predicted pixel value according to the step.

Image blocks whose sizes are 32×32 and 64×64 are used as an example. Assuming that a step of the 32×32 image block in the horizontal and vertical directions is 2, and a step of the 64×64 image block in the horizontal and vertical directions is 4, the number of predicted pixel values obtained for the image blocks of these two sizes is 16×16.

Correspondingly, the decoder may perform decoding processing by using a processing process corresponding to that of the coder.

Optionally, the foregoing process in which the predicted pixel value is obtained according to the preset step may be preset by the coder and the decoder, and may also not be preset.

When the process is not preset by the coder or the decoder, for example, when the coder compares all processing results obtained by using values of all steps, and determines an optimal step that is used to perform processing, the value of the preset step may further be coded during coding, so that the decoder performs corresponding processing according to the value that identifies the step.

S304. Calculate a first average value of the prediction data according to the predicted pixel value, and calculate a second average value of the data of the current image block according to the pixel value of the data of the current image block.

S305. Perform a difference operation between the second average value of the data of the current image block and the first average value of the prediction data of the current image block to obtain a residual of the current image block.

S306. Perform coding processing on the residual to acquire a coding result of the current image block.

In this step, optionally, the performing coding processing on the residual at least includes the following several implementation manners:

A first implementation manner: Quantization is performed on the residual and the residual is quantized to a smaller value. Fewer bits are used to code the residual. Correspondingly, a same quantization scale is used to perform dequantization processing at the decoder, and a result obtained after the dequantization processing is used as the residual that needs to be used.

A second implementation manner: The residual is directly coded. Correspondingly, the decoder performs decoding processing on the residual, and uses a result of the decoding processing as the residual that needs to be used, so as to avoid compression loss brought about by the quantization.

A third implementation manner: The residual may be mapped to another residual, and coding processing is performed on the another residual, and the number of bits that represent the another residual is less than the number of bits that represent the residual. Therefore, coding efficiency can be further improved. Correspondingly, the decoder may also use a corresponding manner to perform inverse mapping on a coding result.

In specific implementation, mapping may be performed according to a mapping table. For example, pixel values in the depth map are 8, 64, 164, 240, and 245, and corresponding pixel values in the mapping table is 1, 2, 3, 4, and 5. This manner may be used to reduce coding bits, further improving coding efficiency.

S307. Perform Other processing.

Other processing, for example, may be performing coding processing on a residual matrix to obtain the coding result, where the residual matrix is obtained by successively performing a difference operation between each pixel value of the data of the current image block and each pixel value of reference data corresponding to the current image block, or using a wedgelet method to perform coding processing on a residual matrix to obtain the coding result, where the residual matrix is obtained by successively performing a difference operation between a pixel value of each pixel in the current image block and a constant value, and details are not described herein again in this embodiment.

In this embodiment, data of a current image block of a depth map is obtained; a predicted pixel value is obtained from the data of the current image block according to a preset step; prediction data corresponding to the current image block of the depth map is obtained; the predicted pixel value is obtained from the prediction data according to the preset step. A first average value of the prediction data is calculated according to the predicted pixel value; a second average value of the data of the current image block is calculated according to the pixel value of the data of the current image block; a difference operation is performed between the second average value of the data of the current image block and the first average value of the prediction data of the current image block to obtain a residual of the current image block; and coding processing is performed on the residual to acquire a coding result of the current image block. In this way, the number of reference pixels of the prediction data of the current image block and the number of reference pixels of the data of the current image block can be reduced. Therefore, a calculation amount is remarkably reduced when the first average value of the prediction data of the current image block and the second average value of the data of the current image block are acquired by means of calculation, improving coding efficiency. Correspondingly, when a decoder performs decoding processing on the current image block, if a decoding method that is corresponding to a coding method of a coder is used to perform decoding processing, a calculation amount is also remarkably reduced. Therefore, a technical solution of this embodiment may be adopted to effectively improve coding and decoding efficiency.

Figure 4:
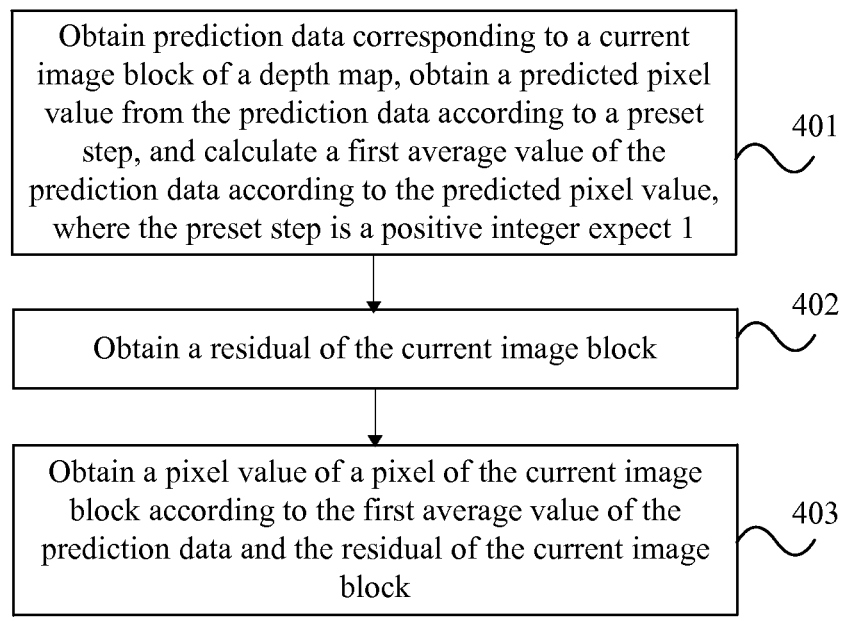
FIG. 4 is a schematic flowchart of Embodiment 1 of a method for decoding a depth map according to the present invention.

FIG. 4 is a schematic flowchart of Embodiment 1 of a method for decoding a depth map according to the present invention. As shown in FIG. 4, this embodiment is executed by a decoding apparatus. The method in this embodiment includes:

S401. Obtain prediction data corresponding to a current image block of the depth map, obtain a predicted pixel value from the prediction data according to a preset step, and calculate a first average value of the prediction data according to the predicted pixel value, where the preset step is a positive integer except 1.

In this embodiment, the preset step may be used to identify an interval between position coordinates of the prediction data.

Specifically, a decoder may still use a process corresponding to that of the foregoing coder to implement a step of obtaining a predicted pixel value from the prediction data according to a preset step.

For example, if a size of the prediction data of the current image block is 8×8, that is, 64 pixels. If the preset step is 2, 2:1 downsampling processing may be performed on the prediction data of the current image block. That is, sampling is performed once on each pixel in both horizontal and vertical directions to acquire a pixel, so that the predicted pixel value can be obtained.

S402. Obtain a residual of the current image block.

Specifically, the coder may obtain the prediction data corresponding to the current image block of the depth map, obtain the predicted pixel value from the prediction data according to the preset step, calculate the first average value of the prediction data according to the predicted pixel value, obtain the residual according to the first average value of the prediction data and a pixel value of a pixel of the current image block, and code and send the residual to the decoder; the decoder may acquire the residual of the current image block from a bitstream.

S403. Obtain a pixel value of a pixel of the current image block according to the first average value of the prediction data and the residual of the current image block.

In this embodiment, prediction data corresponding to a current image block of a depth map is obtained; a predicted pixel value is obtained from the prediction data according to a preset step; a first average value of the prediction data is calculated according to the predicted pixel value, where the preset step is a positive integer except 1; a residual of the current image block is obtained; and a pixel value of a pixel of the current image block is obtained according to the first average value of the prediction data and the residual of the current image block. In this way, the number of reference pixels of the prediction data of the current image block can be reduced. Therefore, a calculation amount is remarkably reduced when the first average value of the prediction data of the current image block is acquired by means of calculation, improving decoding efficiency.

In the foregoing embodiment, in specific implementation, the step S403 may be implemented, for example, in the following two manners:

Manner 1: Add the first average value of the prediction data of the current image block and the residual of the current image block to obtain the pixel value of the pixel of the current image block.

To correspond to this manner, if a processing process of the coder is performing a difference operation between the pixel value of the pixel of the current image block and the first average value of the prediction data of the current image block to obtain the residual of the current image block, the decoder may add the first average value of the prediction data of the current image block and the residual of the current image block to obtain the pixel value of the pixel of the current image block.

Manner 2: Add the first average value of the prediction data of the current image block and the residual to obtain an average pixel value of the current image block, and use the average pixel value of the current image block as the pixel value of the pixel of the current image block.

To correspond to this manner, if a processing process of the coder is obtaining data of the current image block of the depth map, obtaining a predicted pixel value from the data of the current image block according to the preset step, calculating a second average value of the data of the current image block according to the predicted pixel value of the data of the current image block, and performing a difference operation between the second average value of the data of the current image block and the first average value of the prediction data of the current image block to obtain the residual of current image block, a processing process corresponding to the decoder is adding the first average value of the prediction data of the current image block and the residual to obtain the average pixel value of the current image block, and using the average pixel value of the current image block as the pixel value of the pixel of the current image block.

The following uses a specific embodiment to describe the decoding method of the present invention in detail.

Figure 5:
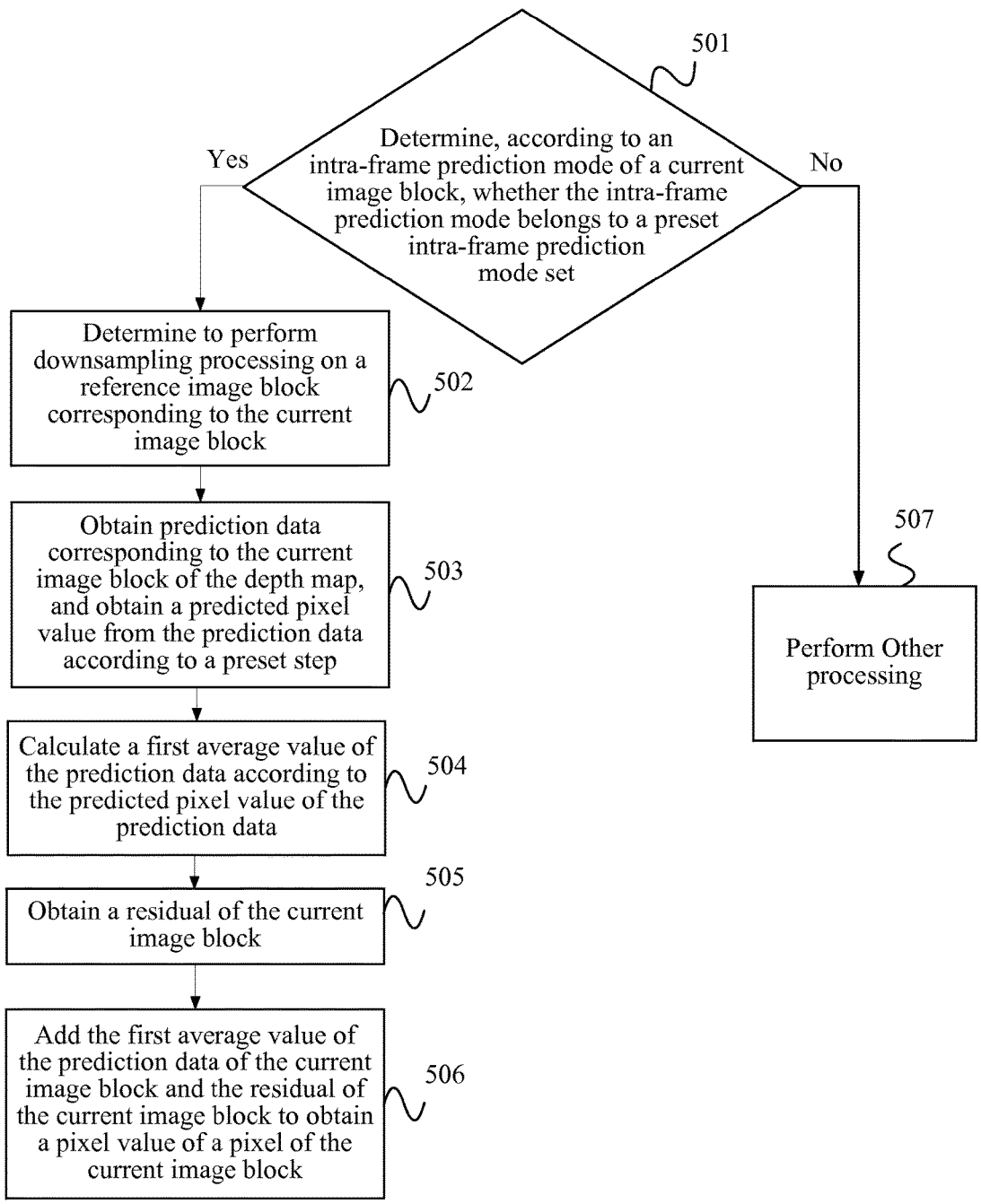
FIG. 5 is a schematic flowchart of Embodiment 2 of a method for decoding a depth map according to the present invention.

FIG. 5 is a schematic flowchart of Embodiment 2 of a method for decoding a depth map according to the present invention. This embodiment is executed by a decoding apparatus. The method in this embodiment includes:

S501. Determine, according to an intra-frame prediction mode of a current image block, whether the intra-frame prediction mode belongs to a preset intra-frame prediction mode set. If yes, perform S502 to S506; if no, perform S507.

S502. Determine to perform downsampling processing on a reference image block corresponding to the current image block.

The intra-frame prediction mode set in this embodiment includes at least a DC mode, a planar mode, an explicit wedgelet mode, and an intra-predicted wedgelet partitioning mode. Before downsampling processing is performed, according to a preset downsampling rule, on the reference image block corresponding to the current image block, whether the intra-frame prediction mode belongs to the intra-frame prediction mode set needs to be determined first. Correspondingly, when a coder has the same intra-frame prediction mode set as a decoder and before downsampling processing is performed on the current image block and the reference image block corresponding to the current image block, whether the intra-frame prediction mode belongs to the intra-frame prediction mode set also needs to be determined first.

The preset intra-frame prediction mode set is a set of intra-frame prediction modes that can, as proved by tests at the coder, obtain relatively good coding processing performance by using an average value.

If yes, it is determined that downsampling processing is performed on the reference image block corresponding to the current image block.

It should be noted that the steps S501 and S502 are optional. These steps may not be performed, and the steps S503 to S506 may be directly performed.

S503. Obtain prediction data corresponding to the current image block of the depth map, and obtain a predicted pixel value from the prediction data according to a preset step.

The obtaining a predicted pixel value from the prediction data according to a preset step may be implemented in the following three manners:

Manner 1: Use, according to a size of the current image block, an equal step in a horizontal direction and a vertical direction to obtain the predicted pixel value.

For example, an equal step of 4 is used to obtain the predicted pixel value. For a current image block whose size is 64×64, if 4:1 downsampling is performed in the horizontal direction and the vertical direction to obtain the predicted pixel value, the number of the obtained predicted pixel values is 16×16.

Manner 2: Use, according to a size of the current image block, an unequal step in a horizontal direction and a vertical direction to obtain the predicted pixel value.

For example, a step 2 is used in the horizontal direction and a step 4 is used in the vertical direction to obtain the predicted pixel value. For a current image block whose size is 16×16, if 2:1 downsampling is performed in the horizontal direction to obtain a predicted pixel value in the horizontal direction, and 4:1 Downsampling is performed in the vertical direction to obtain a predicted pixel value in the vertical direction, the number of the obtained predicted pixel values is 8×4.

Manner 3: Determine a step according to a size of the current image block, and obtain the predicted pixel value according to the step.

Image blocks whose sizes are 32×32 and 64×64 are used as an example. Assuming that a step of the 32×32 image block in the horizontal and vertical directions is 2, and a step of the 64×64 image block in the horizontal and vertical directions is 4, the number of predicted pixel values obtained for the image blocks of these two sizes is 16×16.

Optionally, the foregoing process in which the predicted pixel value is obtained according to the preset step may be preset by the coder and the decoder, and may also not be preset.

When the process is not preset by the coder or the decoder, for example, when the coder compares all processing results obtained by using values of all steps, and determines an optimal step that is used to perform processing, the coder needs to code the value of the preset step during coding, and the decoder may parse the value that identifies the step from a bitstream.

S504. Calculate a first average value of the prediction data according to the predicted pixel value of the prediction data.

The number of predicted pixel values of the prediction data is less than the number of pixels of the prediction data; therefore, a calculation amount of the step S504 is reduced, improving decoding efficiency.

S505. Obtain a residual of the current image block.

Specifically, this step may use the following several implementation manners, and each implementation manner corresponds to an implementation manner of the coder:

A first implementation manner: A quantization manner that is the same as that of the coder is used to perform dequantization processing on the residual, and a result obtained after the dequantization processing is used as the residual that needs to be used.

A second implementation manner: When the coder directly codes the residual, the decoder performs decoding processing on the residual and uses a result of the decoding processing as the residual that needs to be used, so as to avoid compression loss brought about by the quantization.

A third implementation manner: When the coder maps the residual to a mapping value of the residual, coding processing is performed on the mapping value of the residual, and the number of bits that represent the mapping value of the residual is less than the number of bits that represent the residual. Therefore, coding efficiency can be further improved. The decoder may also use a corresponding manner to perform inverse mapping on a coding result.

S506. Add the first average value of the prediction data of the current image block and the residual of the current image block to obtain a pixel value of a pixel of the current image block.

This step is an implementation process of using Manner 1 of the foregoing step S403. It may be understood that if the coder uses a coding process corresponding to Manner 2, this step may also be implemented by using Manner 2 of the foregoing step S403.

S507. Other processing.

Other processing, for example, corresponding to the coder, may be that the decoder performs decoding processing on the coding result to obtain a residual matrix, successively performs a summation operation between the residual matrix and pixels of a reference image block to obtain a sum value matrix, and reconstructs the current image block according to the sum value matrix. Alternatively, when the coder uses a wedgelet method to perform coding processing on a residual matrix to obtain the coding result, where the residual matrix is obtained by performing a difference operation between a pixel value of each pixel in the current image block and a constant value, the decoder performs decoding processing on the coding result to obtain a residual matrix, performs a summation operation between each pixel in the residual matrix and the constant value to obtain a sum value matrix, and reconstructs the current image block according to the sum value matrix. Details are not described herein again in this embodiment.

In this embodiment, prediction data corresponding to a current image block of a depth map is obtained; a predicted pixel value is obtained from the prediction data according to a preset step; a first average value of the prediction data is calculated according to the predicted pixel value of the prediction data; a residual of the current image block is obtained; the first average value of the prediction data of the current image block and the residual of the current image block are added to obtain a pixel value of a pixel of the current image block. In this way, the number of reference pixels of the prediction data of the current image block can be reduced. Therefore, a calculation amount is remarkably reduced when the first average value of the prediction data of the current image block is acquired by means of calculation, improving decoding efficiency.

It should be noted that a technical solution in this embodiment of the present invention may further be applied to another intra-frame prediction method in which an average value needs to be coded and decoded. For example, the coder performs a difference operation between the average value of the current image block and the constant value and codes the residual to acquire a coding result. The decoder performs decoding processing on the coding result, obtains the residual, performs a summation operation between the residual and the constant value, uses a sum value as a pixel value of each pixel of the current image block, and reconstructs the current image block. When the coder performs an averaging operation on the current image block, the predicted pixel value of the current image block may also be acquired according to the preset step; an averaging operation is performed on the predicted pixel value of the current image block; a difference operation is performed between the average value and the constant value to obtain the residual; and the residual is coded to obtain the coding result. Correspondingly, the decoder may also use a similar method to perform decoding processing, improving coding and decoding efficiency.

Figure 6:
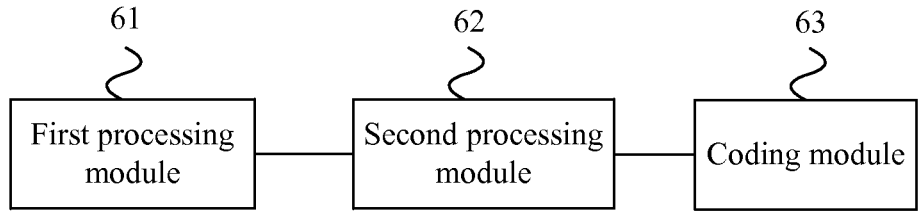
FIG. 6 is a schematic structural diagram of Embodiment 1 of an apparatus for coding a depth map according to the present invention.

FIG. 6 is a schematic structural diagram of Embodiment 1 of an apparatus for coding a depth map according to the present invention. As shown in FIG. 6, the apparatus in this embodiment includes a first processing module 61, a second processing module 62, and a coding module 63, where the first processing module 61 is configured to obtain prediction data corresponding to a current image block of the depth map, obtain a predicted pixel value from the prediction data according to a preset step, and calculate a first average value of the prediction data according to the predicted pixel value, where the preset step is a positive integer except 1; the second processing module 62 is configured to obtain a residual according to the first average value of the prediction data and a pixel value of a pixel of the current image block; and the coding module 63 is configured to code the residual of the current image block.

The coding apparatus in this embodiment may be used to implement the technical solution in the method embodiment shown in FIG. 1, and implementation principles and technical effects of the apparatus are similar and are not described herein again.

In the foregoing embodiment, the second processing module 62 is configured to perform a difference operation between the pixel value of the pixel of the current image block and the first average value of the prediction data of the current image block to obtain the residual of the current image block; or obtain data of the current image block of the depth map, obtain the predicted pixel value from the data of the current image block according to the preset step, calculate a second average value of the data of the current image block according to the predicted pixel value of the data of the current image block, and perform a difference operation between the second average value of the data of the current image block and the first average value of the prediction data of the current image block to obtain the residual of the current image block.

In the foregoing embodiment, the first processing module 61 is specifically configured to use, according to a size of the current image block, an equal step in a horizontal direction and a vertical direction to obtain the predicted pixel value; or use, according to a size of the current image block, an unequal step in a horizontal direction and a vertical direction to obtain the predicted pixel value.

In the foregoing embodiment, the coding module 63 is further configured to code a value of the preset step.

In the foregoing embodiment, the preset step is used to identify an interval between position coordinates of the prediction data.

In the foregoing embodiment, the coding module 63 is specifically configured to map the residual to a mapping value of the residual, where the number of bits that represent the mapping value of the residual is less than the number of bits that represent the residual, and code the mapping value of the residual.

In the foregoing embodiment, the first processing module 61 is further configured to determine, according to an intra-frame prediction mode of the current image block, whether the intra-frame prediction mode belongs to a preset intra-frame prediction mode set; and if yes, determine to obtain the predicted pixel value from the prediction data according to the preset step.

In the foregoing embodiment, the intra-frame prediction mode set includes at least one of the following intra-frame prediction modes: a direct current (DC) mode, a Planar mode, an explicit Wedgelet mode, and an intra-predicted Wedgelet partitioning mode.

The coding apparatus in this embodiment may be used to implement the technical solution in the method embodiment shown in FIG. 3, and implementation principles and technical effects of the apparatus are similar and are not described herein again.

Figure 7:
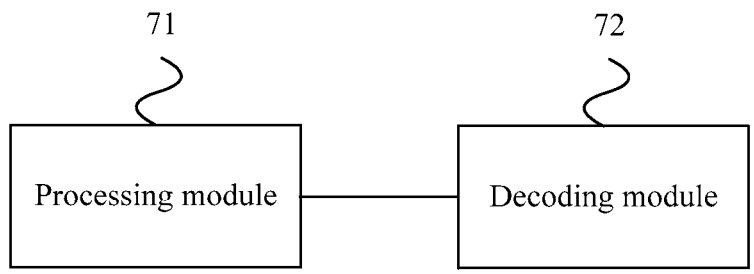
FIG. 7 is a schematic structural diagram of Embodiment 1 of an apparatus for decoding a depth map according to the present invention.

FIG. 7 is a schematic structural diagram of Embodiment 1 of an apparatus for decoding a depth map according to the present invention. As shown in FIG. 7, the apparatus in this embodiment includes: a processing module 71 and a decoding module 72, where the processing module 71 is configured to obtain prediction data corresponding to a current image block of the depth map, obtain a predicted pixel value from the prediction data according to a preset step, and calculate a first average value of the prediction data according to the predicted pixel value, where the preset step is a positive integer except 1; and the decoding module 72 is configured to obtain a residual of the current image block, and obtain a pixel value of a pixel of the current image block according to the first average value of the prediction data and the residual of the current image block.

The decoding apparatus in this embodiment may be used to implement the technical solution in the method embodiment shown in FIG. 4, and implementation principles and technical effects of the apparatus are similar and are not described herein again.

In the foregoing embodiment, the decoding module 72 is specifically configured to add the first average value of the prediction data of the current image block and the residual of the current image block to obtain the pixel value of the pixel of the current image block; or add the first average value of the prediction data of the current image block and the residual to obtain an average pixel value of the current image block, and use the average pixel value of the current image block as the pixel value of the pixel of the current image block.

In the foregoing embodiment, the processing module 71 is specifically configured to use, according to a size of the current image block, an equal step in a horizontal direction and a vertical direction to obtain the predicted pixel value; or use, according to a size of the current image block, an unequal step in a horizontal direction and a vertical direction to obtain the predicted pixel value.

In the foregoing embodiment, the decoding module 72 is further configured to parse a bitstream to obtain a value that identifies the step.

In the foregoing embodiment, the preset step is used to identify an interval between position coordinates of the prediction data.

In the foregoing embodiment, the decoding module 72 is specifically configured to perform decoding processing on a coding result of the current image block to obtain a mapping value of the residual of the current image block; and map the mapping value of the residual to the residual, and use the residual as the residual of the current image block, where the number of bits that represent the mapping value of the residual is less than the number of bits that represent the residual.

In the foregoing embodiment, the processing module 71 is further configured to determine, according to an intra-frame prediction mode of the current image block, whether the intra-frame prediction mode belongs to a preset intra-frame prediction mode set; and if yes, determine to obtain the predicted pixel value from the prediction data according to the preset step.

In the foregoing embodiment, the intra-frame prediction mode set includes at least one of the following intra-frame prediction modes: a direct current (DC) mode, a Planar mode, an explicit Wedgelet mode, and an intra-predicted Wedgelet partitioning mode.

The coding apparatus in this embodiment may be used to implement the technical solution in the method embodiment shown in FIG. 5, and implementation principles and technical effects of the apparatus are similar and are not described herein again.

Figure 8:
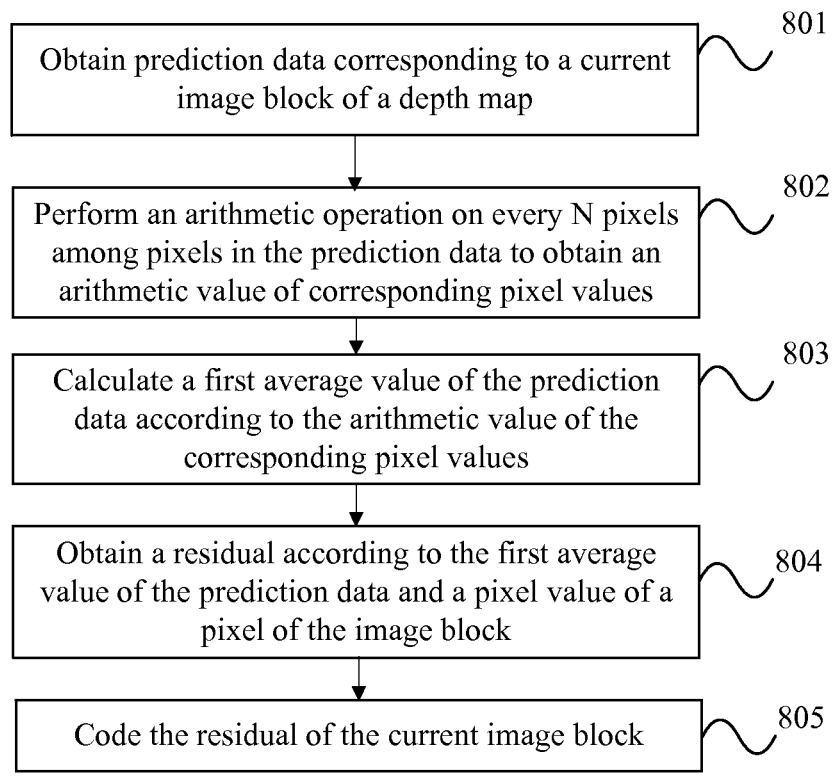
FIG. 8 is a schematic flowchart of Embodiment 3 of a method for coding a depth map according to the present invention.

FIG. 8 is a schematic flowchart of Embodiment 3 of a method for coding a depth map according to the present invention. As shown in FIG. 8, the method in this embodiment includes:

S801. Obtain prediction data corresponding to a current image block of the depth map.

Specifically, the corresponding prediction data may be obtained according to a prediction mode of the current image block.

S802. Perform an arithmetic operation on every N pixels among pixels in the prediction data to obtain an arithmetic value of corresponding pixel values.

As a feasible implementation manner, an averaging operation is performed on the every N pixels among the pixels in the prediction data to obtain an average pixel value, and the average pixel value is used as the arithmetic value of the corresponding pixel values.

Other pixel processing may also be performed on the every N pixels among the pixels in the prediction data to obtain an arithmetic value of corresponding pixel values, which is not limited by the present invention.

Correspondingly, a decoder uses the same arithmetic operation as a coder to obtain an arithmetic value of corresponding pixel values.

S803. Calculate a first average value of the prediction data according to the arithmetic value of the corresponding pixel values.

S804. Obtain a residual according to the first average value of the prediction data and a pixel value of a pixel of the image block.

Optionally, as a feasible implementation manner, a difference operation is performed between the pixel value of the pixel of the image block and the first average value of the prediction data of the current image block to obtain the residual of the current image block.

As another feasible implementation manner, data of the current image block of the depth map is obtained; a predicted pixel value is obtained from the data of the current image block according to a preset step; a second average value of the prediction data is calculated according to the predicted pixel value; and a difference operation is performed between the second average value of the image block and the first average value of a reference image block of the current image block to obtain the residual of the current image block.

S805. Code the residual of the current image block.

In this embodiment, prediction data corresponding to a current image block of a depth map is obtained; an arithmetic operation is performed on every N pixels among pixels in the prediction data to obtain an arithmetic value of corresponding pixel values; a first average value of the prediction data is calculated according to the arithmetic value of the corresponding pixel values; a residual is obtained according to the first average value of the prediction data and a pixel value of a pixel of the image block; and the residual of the current image block is coded. Because an arithmetic operation is performed on the every N pixels among the pixels in the prediction data to obtain the arithmetic value of the corresponding pixel values, a relatively good pixel value is obtained, thereby improving coding and decoding efficiency.

Figure 9:
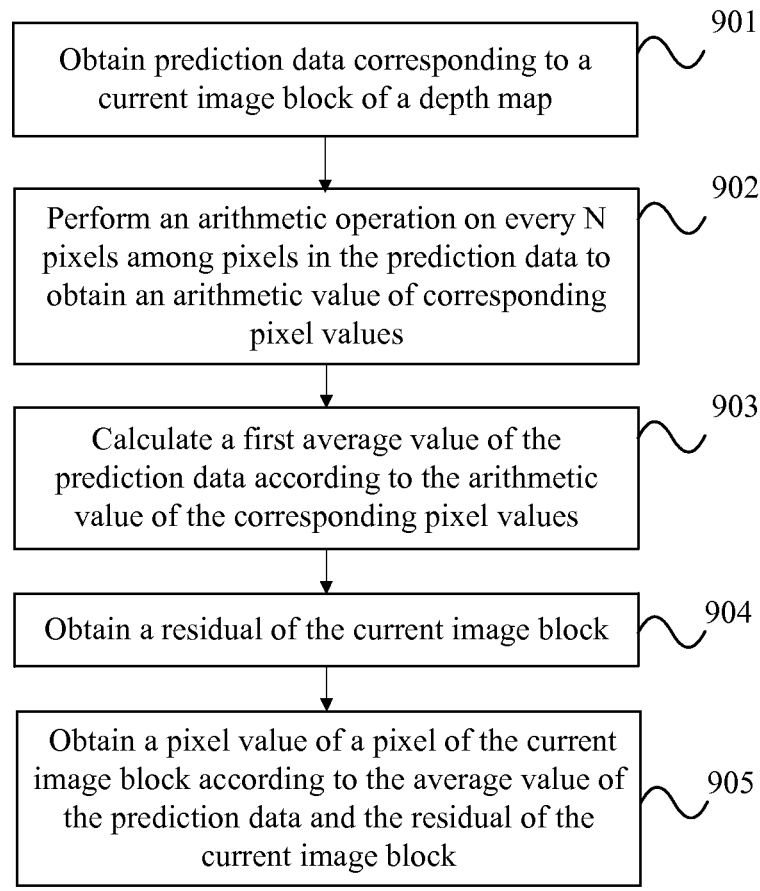
FIG. 9 is a schematic flowchart of Embodiment 3 of a method for decoding a depth map according to the present invention.

FIG. 9 is a schematic flowchart of Embodiment 3 of a method for decoding a depth map according to the present invention. As shown in FIG. 9, the method in this embodiment includes:

S901. Obtain prediction data corresponding to a current image block of the depth map.

Specifically, the corresponding prediction data may be obtained according to a prediction mode of the current image block.

S902. Perform an arithmetic operation on every N pixels among pixels in the prediction data to obtain an arithmetic value of corresponding pixel values.

As a feasible implementation manner, an averaging operation is performed on the every N pixels among the pixels in the prediction data to obtain an average pixel value, and the average pixel value is used as the arithmetic value of the corresponding pixel values.

Other pixel processing may also be performed on the every N pixels among the pixels in the prediction data to obtain an arithmetic value of corresponding pixel values, which is not limited by the present invention.

Arithmetic processing used by a decoder to obtain the arithmetic value of the corresponding pixel values is the same as that of a coder.

S903. Calculate a first average value of the prediction data according to the arithmetic value of the corresponding pixel values.

S904. Obtain a residual of the current image block.

S905. Obtain a pixel value of a pixel of the current image block according to the first average value of the prediction data and the residual of the current image block.

Optionally, as a feasible implementation manner, the first average value of the prediction data of the current image block and the residual of the current image block are added to obtain the pixel value of the pixel of the current image block.

As another feasible implementation manner, the first average value of the prediction data of the current image block and the residual are added to obtain an average pixel value of the current block, and the average pixel value of the current block is used as the pixel value of the pixel of the current image block.

In this embodiment, prediction data corresponding to a current image block of a depth map is obtained; an arithmetic operation is performed on every N pixels among pixels in the prediction data to obtain an arithmetic value of corresponding pixel values; a first average value of the prediction data is calculated according to the arithmetic value of the corresponding pixel values; a residual of the current image block is obtained; and a pixel value of a pixel of the current image block is obtained according to the first average value of the prediction data and the residual of the current image block. The residual of the current image block is coded. An arithmetic operation is performed on the every N pixels among the pixels in the prediction data; therefore, the arithmetic value of the corresponding pixel values is obtained, thereby improving coding and decoding efficiency.

Figure 10:
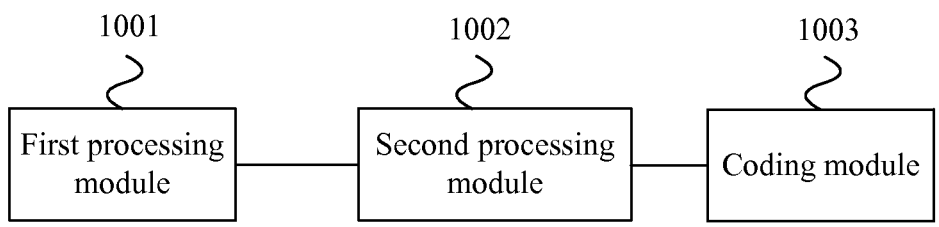
FIG. 10 is a schematic structural diagram of Embodiment 2 of an apparatus for coding a depth map according to the present invention.

FIG. 10 is a schematic structural diagram of Embodiment 2 of an apparatus for coding a depth map according to the present invention. As shown in FIG. 10, the apparatus in this embodiment includes: a first processing module 1001, a second processing module 1002, and a coding module 1003, where the first processing module 1001 is configured to obtain prediction data corresponding to a current image block of the depth map, perform an arithmetic operation on every N pixels among pixels in the prediction data to obtain an arithmetic value of corresponding pixel values, and calculate a first average value of the prediction data according to the arithmetic value of the corresponding pixel values; the second processing module 1002 is configured to obtain a residual according to the first average value of the prediction data and a pixel value of a pixel of the current image block; and the coding module 1003 is configured to code the residual of the current image block.

In the foregoing embodiment, the first processing module 1001 is specifically configured to perform an averaging operation on the every N pixels among the pixels in the prediction data to obtain an average pixel value, and use the average pixel value as the arithmetic value of the corresponding pixel values.

In the foregoing embodiment, the second processing module 1002 is specifically configured to perform a difference operation between the pixel value of the pixel of the current image block and the first average value of the prediction data of the current image block to obtain the residual of the current image block; or obtain data of the current image block of the depth map, obtain a predicted pixel value from the data of the current image block according to a preset step, calculate a second average value of the prediction data according to the predicted pixel value, and perform a difference operation between the second average value of the image block and the first average value of a reference block of the current image block to obtain the residual of the current image block.

The coding apparatus in this embodiment may be used to implement the technical solution in the method embodiment shown in FIG. 8, and implementation principles and technical effects of the apparatus are similar and are not described herein again.

Figure 11:
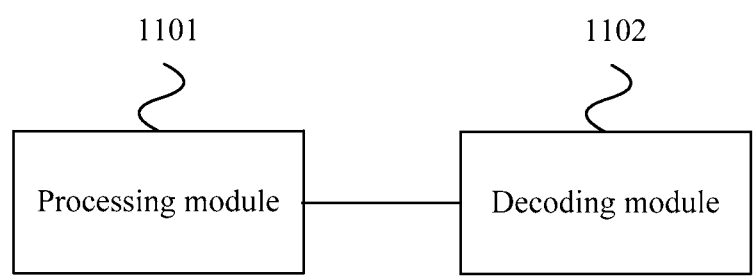
FIG. 11 is a schematic structural diagram of Embodiment 2 of an apparatus for decoding a depth map according to the present invention.

FIG. 11 is a schematic structural diagram of Embodiment 2 of an apparatus for decoding a depth map according to the present invention. The apparatus in this embodiment includes a processing module 1101 and a decoding module 1102, where the processing module 1101 is configured to obtain prediction data corresponding to a current image block of the depth map, perform an arithmetic operation on every N pixels among pixels in the prediction data to obtain an arithmetic value of corresponding pixel values, and calculate a first average value of the prediction data according to the arithmetic value of the corresponding pixel values; and the decoding module 1102 is configured to obtain a residual of the current image block, and obtain a pixel value of a pixel of the current image block according to the first average value of the prediction data and the residual of the current image block.

In the foregoing embodiment, the processing module 1101 is specifically configured to perform an averaging operation on the every N pixels among the pixels in the current image block and the prediction data to obtain an average pixel value, and use the average pixel value as the arithmetic value of the corresponding pixel values.

In the foregoing embodiment, the decoding module 1102 is specifically configured to add the first average value of the prediction data of the current image block and the residual of the current image block to obtain the pixel value of the pixel of the current image block; or add the first average value of the prediction data of the current image block and the residual to obtain an average pixel value of the current image block, and use the average pixel value of the current image block as the pixel value of the pixel of the current image block.

The decoding apparatus in this embodiment may be used to implement the technical solution in the method embodiment shown in FIG. 9, and implementation principles and technical effects of the apparatus are similar and are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for coding a depth map provided by one or more processing modules and a coding module executing instructions stored in a non-transitory, computer-readable storage medium so as to configure the modules to provide the method of:
   obtaining, by a first processing module, prediction data of a current image block of the depth map;
   determining, by the first processing module, according to an intra-frame prediction mode of the current image block, that the intra-frame prediction mode belongs to a preset intra-frame prediction mode set;
   obtaining, by the first processing module, a predicted pixel value from the prediction data according to a preset step;
   calculating, by the first processing module, a first average value of the prediction data according to the predicted pixel value, wherein the preset step is determined based on a size of the current image block;
   obtaining, by a second processing module, a residual of the current image block according to the first average value of the prediction data and a pixel value of a pixel of the current image block; and
   coding, by a coding module, the residual of the current image block.

2. The method according to claim 1, wherein obtaining the residual of the current image block comprises one selected from the group consisting of:
   (a) performing a difference operation between the pixel value of the pixel of the current image block and the first average value of the prediction data of the current image block to obtain the residual of the current image block; and
   (b) determining a second average value of the data of the current image block according to the predicted pixel value of the predicted data of the current image block, and performing a difference operation between the second average value of the data of the current image block and the first average value of reference data of the current image block to obtain the residual of the current image block.

3. The method according to claim 1, further comprising coding a value of the preset step.

4. The method according to claim 1, wherein the preset step is used to identify an interval between position coordinates of the prediction data.

5. The method according to claim 1, wherein the coding the residual of the current image block comprises:
mapping the residual to a mapping value of the residual, wherein a number of bits that represent the mapping value of the residual is less than a number of bits that represent the residual; and
coding the mapping value of the residual.

6. The method according to claim 1, wherein the intra-frame prediction mode set comprises at least one of the following intra-frame prediction modes:
a direct current (DC) mode;
a Planar mode;
an explicit Wedgelet mode; and
an intra-predicted Wedgelet partitioning mode.

7. A method for decoding a depth map provided by processing and decoding modules executing instructions stored in a non-transitory, computer-readable storage medium so as to configure the modules to provide the method of:
obtaining, by a processing module, prediction data of a current image block of the depth map;
determining, by the processing module, according to an intra-frame prediction mode of the current image block, that the intra-frame prediction mode belongs to a preset intra-frame prediction mode set;
obtaining, by the processing module, a predicted pixel value from the prediction data according to a preset step;
calculating, by the processing module, a first average value of the prediction data according to the predicted pixel value, wherein the preset step is determined based on a size of the current image block;
obtaining, by a decoding module, a residual of the current image block; and
obtaining, by the decoding module, a pixel value of a pixel of the current image block according to the first average value of the prediction data and the residual of the current image block.

8. The method according to claim 7, wherein the obtaining a pixel value of a pixel of the current image block according to the first average value of the prediction data and the residual of the current image block comprises one selected from the group consisting of:
(a) adding the first average value of the prediction data of the current image block and the residual of the current image block to obtain the pixel value of the pixel of the current image block; and
(b) adding the first average value of the prediction data of the current image block and the residual to obtain an average pixel value of the current image block, and using the average pixel value of the current image block as the pixel value of the pixel of the current image block.

9. The method according to claim 7, further comprising parsing a bitstream to obtain a value that identifies the step.

10. The method according to claim 7, wherein the preset step is used to identify an interval between position coordinates of the prediction data.

11. The method according to claim 7, wherein the obtaining a residual of the current image block comprises:
performing decoding processing on a coding result of the current image block to obtain a mapping value of the residual of the current image block; and
mapping the mapping value of the residual to the residual, and using the residual as the residual of the current image block, wherein the number of bits that represent the mapping value of the residual is less than the number of bits that represent the residual.

12. The method according to claim 7, wherein the intra-frame prediction mode set comprises at least one of the following intra-frame prediction modes:
a direct current (DC) mode;
a Planar mode;
an explicit Wedgelet mode; and
an intra-predicted Wedgelet partitioning mode.

13. An apparatus for coding a depth map comprising a processor and memory with stored instructions such that when the instructions are executed by the processor, the processor is configured to:
obtain prediction data of a current image block of the depth map;
determine, according to an intra-frame prediction mode of the current image block, that the intra-frame prediction mode belongs to a preset intra-frame prediction mode set;
obtain a predicted pixel value from the prediction data according to a preset step;
calculate a first average value of the prediction data according to the predicted pixel value, wherein the preset step is determined based on a size of the current image block;
obtain a residual of the current image block according to the first average value of the prediction data and a pixel value of a pixel of the current image block; and
code the residual of the current image block.

14. The apparatus according to claim 13, wherein the processor is further configured to perform one selected from the group consisting of:
(a) perform a difference operation between the pixel value of the pixel of the current image block and the first average value of the prediction data of the current image block to obtain the residual of the current image block; and
(b) determine a second average value of the data of the current image block according to the predicted pixel value of the predicted data of the current image block, and perform a difference operation between the second average value of the data of the current image block and the first average value of the prediction data of the current image block to obtain the residual of the current image block.

15. The apparatus according to claim 13, wherein the processor is further configured to code a value of the preset step.

16. The apparatus according to claim 13, wherein the preset step is used to identify an interval between position coordinates of the prediction data.

17. The apparatus according to claim 13, wherein the processor is further configured to map the residual to a mapping value of the residual, wherein a number of bits that represent the mapping value of the residual is less than a number of bits that represent the residual, and code the mapping value of the residual.

18. The apparatus according to claim 13, wherein the intra-frame prediction mode set comprises at least one of the following intra-frame prediction modes:
- a direct current (DC) mode;
- a Planar mode;
- an explicit Wedgelet mode; and
- an intra-predicted Wedgelet partitioning mode.

19. An apparatus for decoding a depth map comprising a processor and a memory with stored instructions such that when the instructions are executed by the processor, the processor is configured to:
- obtain prediction data of a current image block of the depth map;
- determine, according to an intra-frame prediction mode of the current image block, that the intra-frame prediction mode belongs to a preset intra-frame prediction mode set;
- obtain a predicted pixel value from the prediction data according to a preset step;
- calculate a first average value of the prediction data according to the predicted pixel value, wherein the preset step is determined based on a size of the current image block; and
- obtain a residual of the current image block, and obtain a pixel value of a pixel of the current image block according to the first average value of the prediction data and the residual of the current image block.

20. The apparatus according to claim 19, wherein the processor is further configured to perform one selected from the group consisting of:
- (a) add the first average value of the prediction data of the current image block and the residual of the current image block to obtain the pixel value of the pixel of the current image block; and
- (b) add the first average value of the prediction data of the current image block and the residual to obtain an average pixel value of the current image block, and use the average pixel value of the current image block as the pixel value of the pixel of the current image block.

21. The apparatus according to claim 19, wherein the processor is further configured to parse a bitstream to obtain a value that identifies the step.

22. The apparatus according to claim 19, wherein the preset step is used to identify an interval between position coordinates of the prediction data.

23. The apparatus according to claim 19, wherein the processor is further configured to perform decoding processing on a coding result of the current image block to obtain a mapping value of the residual of the current image block, map the mapping value of the residual to the residual of the current image block, and use the mapping value of the residual as the residual of the current image block, wherein a number of bits that represent the mapping value of the residual is less than a number of bits that represent the residual.

24. The apparatus according to claim 19, wherein the intra-frame prediction mode set comprises at least one of the following intra-frame prediction modes:
- a direct current (DC) mode;
- a Planar mode;
- an explicit Wedgelet mode; and
- an intra-predicted Wedgelet partitioning mode.

* * * * *